US010486889B2

(12) United States Patent
Omura

(10) Patent No.: US 10,486,889 B2
(45) Date of Patent: Nov. 26, 2019

(54) DRUG FEEDER

(71) Applicant: TOSHO, INC., Tokyo (JP)

(72) Inventor: Yoshihito Omura, Tokyo (JP)

(73) Assignee: TOSHO, INC., Tokyo (JP)

( * ) Notice: Subject to any disclaimer, the term of this patent is extended or adjusted under 35 U.S.C. 154(b) by 243 days.

(21) Appl. No.: 14/906,598

(22) PCT Filed: Jul. 10, 2014

(86) PCT No.: PCT/JP2014/003670
§ 371 (c)(1),
(2) Date: Jan. 21, 2016

(87) PCT Pub. No.: WO2015/011890
PCT Pub. Date: Jan. 29, 2015

(65) Prior Publication Data

US 2016/0167866 A1 Jun. 16, 2016

(30) Foreign Application Priority Data

Jul. 25, 2013 (JP) ................................ 2013-154912

(51) Int. Cl.
*B65D 83/04* (2006.01)
*B65D 35/06* (2006.01)
(Continued)

(52) U.S. Cl.
CPC ............ *B65D 83/04* (2013.01); *A61J 7/0076* (2013.01); *B65B 35/06* (2013.01); *B65B 59/00* (2013.01);
(Continued)

(58) Field of Classification Search
CPC ...... A61J 7/0076; B65D 83/04; G07F 11/005; G07F 17/0092; G07F 11/42; G07F 11/44;
(Continued)

(56) References Cited

U.S. PATENT DOCUMENTS 2,829,769 A * 4/1958 Rockafellow ...... B65G 47/1457 209/551
3,392,816 A * 7/1968 Cox ........................ B65B 35/26 198/380
(Continued)

FOREIGN PATENT DOCUMENTS

JP 2-193809 A 7/1990
JP 3-102009 A 4/1991
(Continued)

*Primary Examiner* — Gene O Crawford
*Assistant Examiner* — Kelvin L Randall, Jr.
(74) *Attorney, Agent, or Firm* — Birch, Stewart, Kolasch & Birch, LLP

(57) ABSTRACT

Provided is a small drug feeder that includes a container that can restrict the width or height of drugs so that the feeder can handle a wide range of drugs having various different shapes or sizes and be easily adjusted so as to be adapted to individual drugs. A width restricting member that increases or decreases a width of a space over a peripheral portion is disposed so as to face a discharging mechanism that discharges drugs to the outside of a container at speed higher than that of the peripheral portion. An interval between the width restricting member and the discharging mechanism is changed in accordance with a width of a target of measurement held in a measurement chamber. The height of drugs placed on the peripheral portion is restricted by a height restricting member in accordance with the height of the target of measurement.

6 Claims, 9 Drawing Sheets

(51) Int. Cl.

| | |
|---|---|
| ***B65B 59/00*** | (2006.01) |
| ***A61J 7/00*** | (2006.01) |
| ***G07F 11/44*** | (2006.01) |
| ***B65B 35/06*** | (2006.01) |
| ***G07F 17/00*** | (2006.01) |
| ***G07F 11/00*** | (2006.01) |

(52) U.S. Cl.
CPC ............ *G07F 11/005* (2013.01); *G07F 11/44* (2013.01); *G07F 17/0092* (2013.01)

(58) Field of Classification Search
CPC ......... B65B 35/06; B65B 5/103; B65B 59/00; B65G 221/027
See application file for complete search history.

(56) References Cited

U.S. PATENT DOCUMENTS

| | | | | |
|---|---|---|---|---|
| 3,396,737 A * | 8/1968 | Picollo | G07D 3/00 | 221/182 |
| 3,565,086 A * | 2/1971 | Zimmermann | G06M 1/086 | 453/11 |
| 3,837,139 A * | 9/1974 | Roseberg | B65B 57/20 | 221/7 |
| 3,960,293 A * | 6/1976 | Sweet, II | B65G 47/1457 | 198/443 |
| 4,138,009 A * | 2/1979 | Strong | B65G 47/1457 | 198/393 |
| 4,705,156 A * | 11/1987 | Boling | B65G 47/1457 | 198/392 |
| 4,830,172 A * | 5/1989 | Hilton | B65G 47/1457 | 198/392 |
| 5,044,487 A * | 9/1991 | Spatafora | B65G 47/1457 | 198/392 |
| 5,191,960 A * | 3/1993 | Wareham | B23P 19/004 | 198/389 |
| 5,369,940 A * | 12/1994 | Soloman | B65B 57/20 | 53/500 |
| 6,129,200 A * | 10/2000 | Graham | B65G 47/1421 | 198/380 |
| 6,161,721 A * | 12/2000 | Kudera | G07F 11/16 | 221/277 |
| 6,311,825 B1 * | 11/2001 | Schmitt | B65G 47/1457 | 198/392 |
| 7,383,937 B2 * | 6/2008 | Perreault | B65G 47/1464 | 198/392 |
| 7,412,302 B2 * | 8/2008 | Cobb | G07F 17/0092 | 700/231 |
| 9,382,024 B2 * | 7/2016 | Baroncini | B65B 35/28 | |
| 9,533,833 B2 * | 1/2017 | Seitel | B65G 43/08 | |
| 2004/0118753 A1 * | 6/2004 | Belway | A61J 7/02 | 209/551 |
| 2013/0256097 A1 * | 10/2013 | Koike | A61J 7/02 | 198/803.16 |
| 2016/0000655 A1 * | 1/2016 | Yuyama | A61J 7/02 | 221/7 |
| 2016/0193113 A1 * | 7/2016 | Jacobs | B65D 83/04 | 221/7 |

FOREIGN PATENT DOCUMENTS

| | | | |
|---|---|---|---|
| JP | 5-51126 | A | 3/1993 |
| JP | 6-61832 | U | 9/1994 |
| JP | 2002-153541 | A | 5/2002 |
| JP | 2002-338033 | A | 11/2002 |
| JP | 2006-76723 | A | 3/2006 |
| JP | 2010-76873 | A | 4/2010 |
| JP | 2013-495223 | A | 3/2013 |

* cited by examiner

DRUG FEEDER

TECHNICAL FIELD

The present invention relates to a drug feeder that automatically supplies solid drugs, such as tablets or ampoules, for automatic medicine dispensation at hospitals, pharmacies, or other facilities. Specifically, the present invention relates to a drug feeder that holds in random positions a large number of drugs having the same shape and that successively and sequentially discharges these drugs one after another by arranging these drugs using a rotator.

BACKGROUND ART

Examples known as an arranging and feeding device that transports tablets or the like having the same shape while arranging the tablets or the like in a line (see, for example, PTL 1) include a device that includes a turn table, which rotates at a constant speed, and a static external wall disposed along the outer periphery of the turn table. This device also includes a static flow-directing guide and a dispensing portion. The flow-directing guide guides, radially outward, objects that have been carried on the upper surface of the turn table and that have come into contact with the flow-directing guide. The dispensing portion is formed so as to extend through the external wall and guides the objects that have been carried on the upper surface of the turn table along the external wall outward from the surface of the turn table. This device also includes width restricting means and a height restricting member. The width restricting means restricts the width of the dispensed products using a gap between opposing inner and outer members included in the dispensing portion. The height restricting member is disposed in front of the dispensing portion and restricts the height of the dispensed product. The turn table has a flat disc shape.

In order to be capable of holding more objects than in the case of using this flat disc-shaped turn table, a device has been developed that includes a rotator whose central portion is recessed downward into a bowl shape or inverted conical shape and whose upper peripheral portion is formed into a flange shape (see, for example, PTL 2). This is a device including a so-called flanged rotational container. The following two types of device are known as rotary parts feeders including this flanged rotational container:

a device including a static flow-directing guide whose shape has been changed from a shape corresponding to the flat upper surface of the turn table into such a shape as to be adapted to the curved inner surface of the recessed portion of the flanged rotational container; and a device including another rotator instead of the static flow-directing guide, the rotator being held in a horizontal flanged rotational container in an inclined manner.

Known as a drug feeder is a device that includes a driving unit, disposed so as to be fixed to a drawer rack of a drug packaging machine or other places for power supply or control, and a drug cassette, attachable to and detachable from the driving unit for easy drug replenishment or for other purposes. This device holds a large number of drugs in random positions in the drug cassette and discharges the drugs one by one from the drug cassette by intermittently or continuously driving the driving unit as appropriate (see, for example, PTL 3). This drug cassette includes a container unit, which can hold a large number of solid drugs, and an arrangement disc disposed in the container unit so as to be axially rotatable. This drug cassette also includes a large number of vane-shaped partition walls, which are disposed on the outer peripheral surface of the arrangement disk and which partition an annular gap between the container unit and the arrangement disk into a large number of compartments at a regular pitch, and a partition board, which is disposed so as to face an dispensing portion formed at a portion of the bottom portion of the container unit to partition part of the annular gap, the portion of the bottom portion functioning as an undersurface of the annular gap. This drug cassette causes the drugs in the compartments to fall one by one from the dispensing port as a result of axial rotation of the arrangement disk caused by rotation driving of the driving unit.

Such existing drug feeders are categorized as follows and the drug feeders in different categories differ from one another in terms of properties such as drug capacity, provided that the drug feeders in the respective categories have the same size:

a so-called disc rotation type including a turn table having a flat upper surface employed as a rotator (see, for example, PTL 1);

a so-called flange rotation type including a flanged rotational container employed as a rotator (see, for example, PTL 2); and a so-called arrangement disk rotation type including an arrangement disk having partition walls disposed at the outer periphery, the disk being employed as a rotator (see, for example, PTL 3).

Specifically, the disk rotation type drug feeder has the smallest drug capacity, the arrangement disk rotation type drug feeder has the largest drug capacity, and the flange rotation type drug feeder has intermediate drug capacity. A drug feeder having a large capacity has usability when operated so as to be replenished with drugs while being inactive and not replenished with drugs during successive discharge. A drug feeder having a small capacity, on the other hand, has usability when operated so as to be fed drugs as needed.

In view of the above-described difference in capacity or other properties, the arrangement disk rotation type drug feeders have been frequently used for drug packaging machines or other machines in which individual feeding of drugs to each feeder as needed is difficult. The reason why feeding of drugs to each feeder as needed is difficult in these machines is because a drug packaging machine or another machine includes a large number of drug feeders in its storage for handling of many types of drugs.

After an arrangement disk rotation type drug feeder is produced, changing or adjusting the shape or pitch of the partition walls on the outer periphery of the arrangement disk is difficult. Moreover, the arrangement disk rotation type drug feeder is required to be adapted to the outer shape of drugs as much as possible. Thus, in the arrangement disk rotation type drug feeder, different arrangement disks are respectively designed for different types of drug. In addition, a number of arrangement disk rotation type drug feeders are often produced exclusively for each drug, the number being the sum of a number required for being equipped with a drug packaging machine or the like and a number of preliminary feeders.

As described above, an arrangement disk rotation type drug feeder tends to be designed for a specific drug, the range of shapes of drugs handleable by the same drug feeder is narrow, and it frequently takes time for design or produce of a drug feeder prior to use. Thus, a drug packaging machine or another machine including arrangement disk rotation type drug feeder has to leave successive delivery of less frequently used drugs or new drugs having different properties such as sizes, to a manual drug distributing device equipped with the packaging machine in advance or disposed on the outside. In other words, even when the machine includes arrangement disk rotation type drug feeders are installed in a packaging machine, less frequently used drugs or new drugs having different properties such as sizes are handled so as to be manually distributed without using the arrangement disk rotation type drug feeders.

CITATION LIST

Patent Literature

PTL 1: Japanese Unexamined Patent Application Publication No. 02-193809
PTL 2: Japanese Unexamined Patent Application Publication No. 06-061832
PTL 3: Japanese Unexamined Patent Application Publication No. 2002-153541

SUMMARY OF INVENTION

Technical Problem

The manual drug distribution, however, increases the load on an operator and lowers the operating efficiency, whereby a demand for automation that eliminates the need of manual drug distribution has been increasing.

In addition, the variety of shapes and sizes of solid drugs has been increasing with increasing types of drug due to causes such as recent growing competition to produce new drugs. Design and produce of arrangement disk rotation type drug feeders for some new drugs fail to keep up with the demand for the drugs due to a rapid increase in frequency of use of the drugs. Thus, it has been increasingly required that at least some of a large number of drug feeders installed in a tablet packaging machine are adapted to drugs having a wider range of shapes while retaining a function of successive automatic discharge, which eliminates the need for manual drug distribution.

A conceivable way to meet such a demand is to improve a drug feeder that can restrict the width or height of drugs so that the drug feeder is adapted to drugs having a wider range of shapes or sizes. However, among drug feeders that can restrict the width or height of drugs, even a flange rotation type drug feeder, which has a relatively large drug capacity, has smaller drug capacity than the arrangement disk rotation type drug feeder. Specifically, an accommodation space of a flange rotation type drug feeder has a smaller lateral area and a smaller height than that of an arrangement disk rotation type drug feeder that occupies an equivalent area. Thus, it is demanded to reduce the size of the drug feeder by compactly mounting components other than a flanged rotational container so that the rotational container is made larger to have a larger capacity without increasing the occupation area.

A first technical object is to form a small drug feeder that can handle a wide range of drugs having various different shapes or sizes by improving a flange rotation type drug feeder having a large drug capacity among drug feeders that can restrict the width and height of drugs.

In addition, to make such a drug feeder practical, a drug feeder is required to be easily adjusted for adaption to drugs to be handled without impairing the usability.

A second technical object is to form a small drug feeder that can handle a wide range of drugs having various different shapes or sizes and that is easily adjusted so as to be adapted to individual drugs by improving a flange rotation type drug feeder having a large drug capacity among drug feeders that can restrict the width and height of drugs.

Solution to Problem

A drug feeder according to the invention (solving means 1) includes a container including a container portion, which holds solid drugs, and a flange portion, which is disposed on a periphery of the container portion and allows the drugs to be placed thereon; a flow guiding member that guides the drugs contained in the container portion to the flange portion using a relative movement between the flow guiding member and the container; a discharging mechanism disposed so as to extend from a portion of the container to an outside of the container, the discharging mechanism guiding the drugs placed on the flange portion to the outside as dispensed products; a height restricting member that restricts a height of the dispensed products placed on the flange portion before the dispensed products arrive at the discharging mechanism; and a width restricting member that changes an interval between the width restricting member and the discharging mechanism to restrict a width of the dispensed products. The discharging mechanism discharges the dispensed products to the outside at speed higher than speed of the relative movement while holding the dispensed products together with the width restricting member.

The drug feeder according to the invention (solving means 2) is created to solve the above-described second technical object. The drug feeder according to the invention (solving means 2) is the drug feeder according to the solving means 1 and further includes a measurement chamber including a pair of walls, at least one of which is movable so that a distance between the walls is adjustable, the measurement chamber allowing one drug identical to each dispensed product or a substitute for the dispensed product having the same shape as the dispensed product to be held between the pair of walls as a target of measurement; and a transmission mechanism that changes the interval in conjunction with an adjustment of the distance.

The drug feeder according to the invention (solving means 3) is created to highly effectively solve the above-described second technical object. The drug feeder according to the invention (solving means 3) is the drug feeder according to the solving means 2 and further includes an ascending-descending member that ascends and descends with respect to the target of measurement held in the measurement chamber and causes the height restricting member to ascend and descend.

The drug feeder according to the invention (solving means 4) is the drug feeder according to the solving means 3 and further includes at least one of an urging portion, which urges the ascending-descending member to descend, or a stopper, which stops the ascending-descending member ascending or descending.

The drug feeder according to the invention (solving means 5) is the drug feeder according to any one of the solving means 2 to 4 and further includes at least one of an urging portion, which facilitates a decrease of the distance, or a stopper, which stops the adjustment of the distance.

Advantageous Effects of Invention

Such a drug feeder of the present invention (solving means 1) includes a container including a container portion and a flange portion. Thus, the drug feeder is capable of discharging drugs one after another while securing an appropriate level of drug capacity. In addition, the drug restriction width is adjustable by changing the interval between the width restricting member and the discharging mechanism, whereby the drug feeder can handle a wide range of drugs of various different types.

In addition, the discharging mechanism that is capable of intermittently discharging drugs one after another by separating the drugs one from another in a front-rear direction using an acceleration of drugs is disposed so as to extend from a portion of the container to the outside of the container. Thus, the discharging mechanism is disposed so as to be vertically superposed on the container, whereby the drug feeder is made compact in a plan view, which is particularly important for a device including a container having a flange portion that is more likely to have a wide plane. Here, disposing the discharging mechanism so as to extend from a portion of the container to the outside of the container does not cause anything inconvenient for discharging dispensed products because the dispensed products are discharged while being held between the discharging mechanism and the width restricting member.

Thus, a small drug feeder that can handle a wide range of drugs having various different shapes or sizes can be achieved, whereby a first technical object is accomplished.

In a drug feeder according to the present invention (solving means 2), when a target of measurement serving as a sample is placed into a measurement chamber including a pair of walls that can adjust a distance between themselves and then the distance is decreased, the opposing gap between the width restricting member and the discharging mechanism is decreased in accordance with the decrease of the distance. Thus, a width restriction adjustment caused by increasing or decreasing the width of the space over the surface of the flange portion is associated with an adjustment of the opposing gap. In the case where the same drug feeder is used to handle drugs having different widths, the drug feeder can be easily and immediately adapted to a holding width in addition to a restriction width appropriate for the individual drugs by replacing the target of measurement in the measurement chamber and decreasing the distance between the pair of walls.

Thus, a small drug feeder that can handle a wide range of drugs having various different shapes or sizes and that is easily adjusted so as to be adaptable to a restriction width and a holding width appropriate for the individual drugs can be achieved, whereby a second technical object is accomplished.

In a drug feeder according to the present invention (solving means 3), when the ascending-descending member is caused to descend until it comes into contact with the target of measurement in the measurement chamber, the height restricting member also descends accompanying the descent of the ascending-descending member and the restriction height thus decreases. In the case where the same drug feeder is used to handle drugs having different heights, the drug feeder can be easily and immediately adapted to a restriction height appropriate for the individual drugs by replacing the target of measurement and lowering the ascending-descending member until it stops.

Thus, a small drug feeder that can handle a wide range of drugs having various different shapes or sizes and that is easily adjusted so as to be adaptable to not only the width but also the height appropriate for the individual drugs can be achieved, whereby a second technical object is highly effectively accomplished.

In a drug feeder according to the present invention (solving means 4 or 5), an urging portion, if provided, allows a smooth adjustment of the feeder and stably keeps the feeder in the adjusted state and a stopper, if provided, reliably keeps the feeder in the adjusted state.

DESCRIPTION OF EMBODIMENTS

Figure 1:
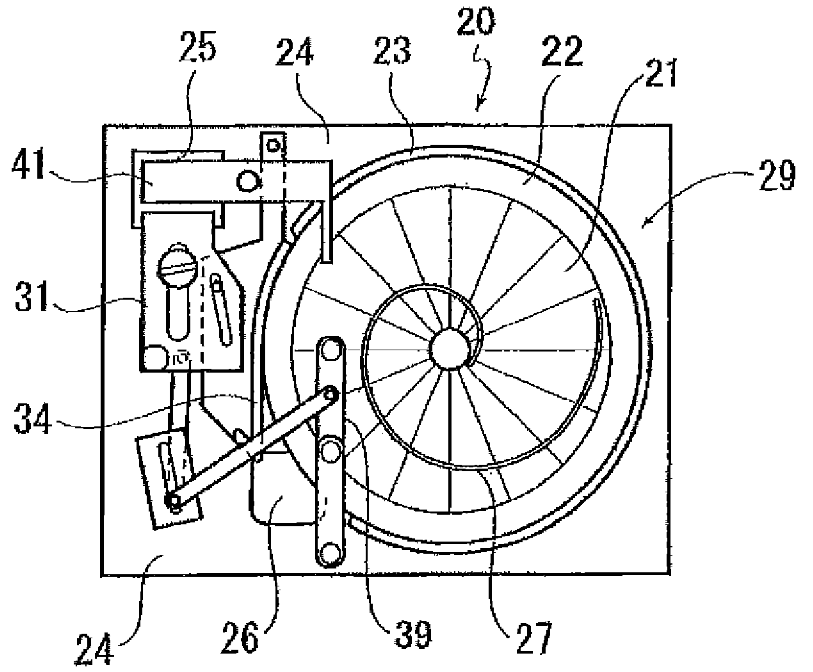
FIG. 1 is a plan view of an example of a drug feeder to which the present invention is applied.

Referring to the drawings, an example of a drug feeder to which the present invention is applied is described.

Here, for simplicity or other purposes, the drawings omit illustrations of components including fastening devices such as bolts, connecting devices such as hinges, electric circuits such as motor drivers, and electronic circuits such as controllers. The drawings mainly illustrate components required or related to the description of the invention.

As illustrated in FIG. 1, a tablet cassette 20, which embodies a drug feeder according to the invention as a removable cassette, is a drug feeder that successively discharges tablets. The tablet cassette 20 includes a rotational container 29, which is a container for tablets, a supporting board 24, which rotationally supports the rotational container 29, and a flow guiding member 27, which is disposed at a fixed position and which moves relative to the rotational container 29 at the time of rotation of the rotational container 29 by rotating relative to the rotational container 29.

Figure 2:
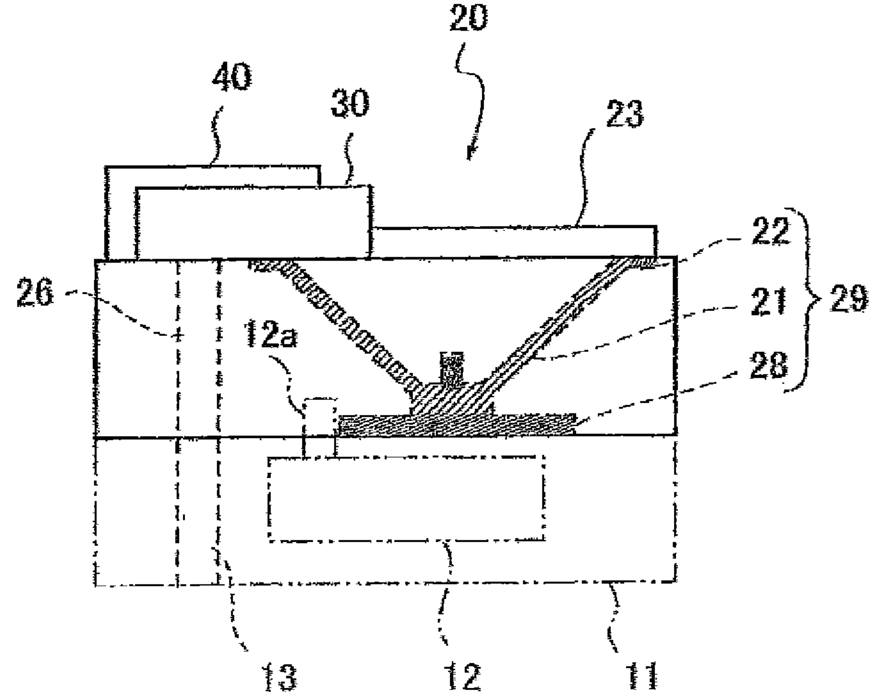
FIG. 2 is a side view of the drug feeder illustrated in FIG. 1 in the state of being mounted on a driving unit.

As illustrated in FIG. 1 or FIG. 2, the rotational container 29 includes a central portion 21, which is recessed downward into a funnel shape and serves as a container portion that contains a large number of tablets in random positions, and a peripheral portion 22, which is disposed at the periphery of the central portion 21 and serves as a flange portion that allows tablets to be mounted thereon in an aligned manner. The rotational container 29 is a flanged rotational container serving as a rotator that rotates around a shaft passing the lowermost portion of the central portion 21 and extending perpendicular to the plane of FIG. 1.

As illustrated in FIG. 1, the supporting board 24 includes an external wall 23, which is an annular wall portion having a gap and disposed along the outer periphery of the peripheral portion 22, and an dispensing port 26, which is disposed at a position corresponding to the gap of the external wall 23 and allows the tablets to be discharged therethrough to the outside of the tablet cassette 20.

The flow guiding member 27 is fixed to the upper surface of the central portion 21 in the state of helically extending from the lowermost portion of the central portion 21, serving as a rotation center of the rotational container 29, toward the peripheral portion 22.

As in the case of the above-described arrangement disk rotation type tablet cassette, the tablet cassette 20 is designed to be attachable to and detachable from a driving unit 11 illustrated in FIG. 2, which is a different unit, for maintaining compatibility with existing products. When the tablet cassette 20 is attached to the driving unit 11, the rotational container 29 is allowed to be driven to axially rotate by a motor 12 included in the driving unit 11 and the dispensing port 26 is vertically connected to an dispensing port 13 included in the driving unit 11.

Figure 3:
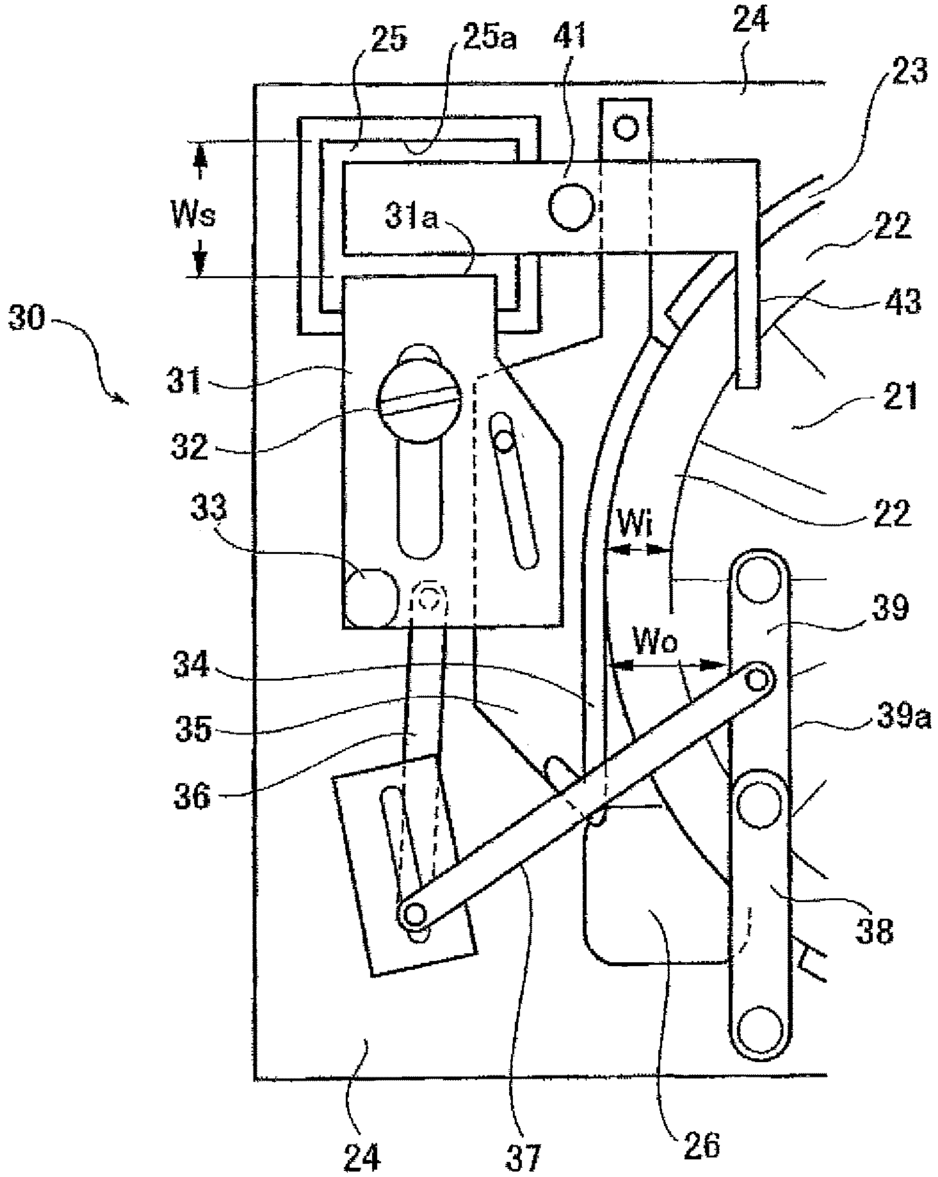
FIG. 3 is a plan view of a portion of the drug feeder illustrated in FIG. 1.
Figure 4:
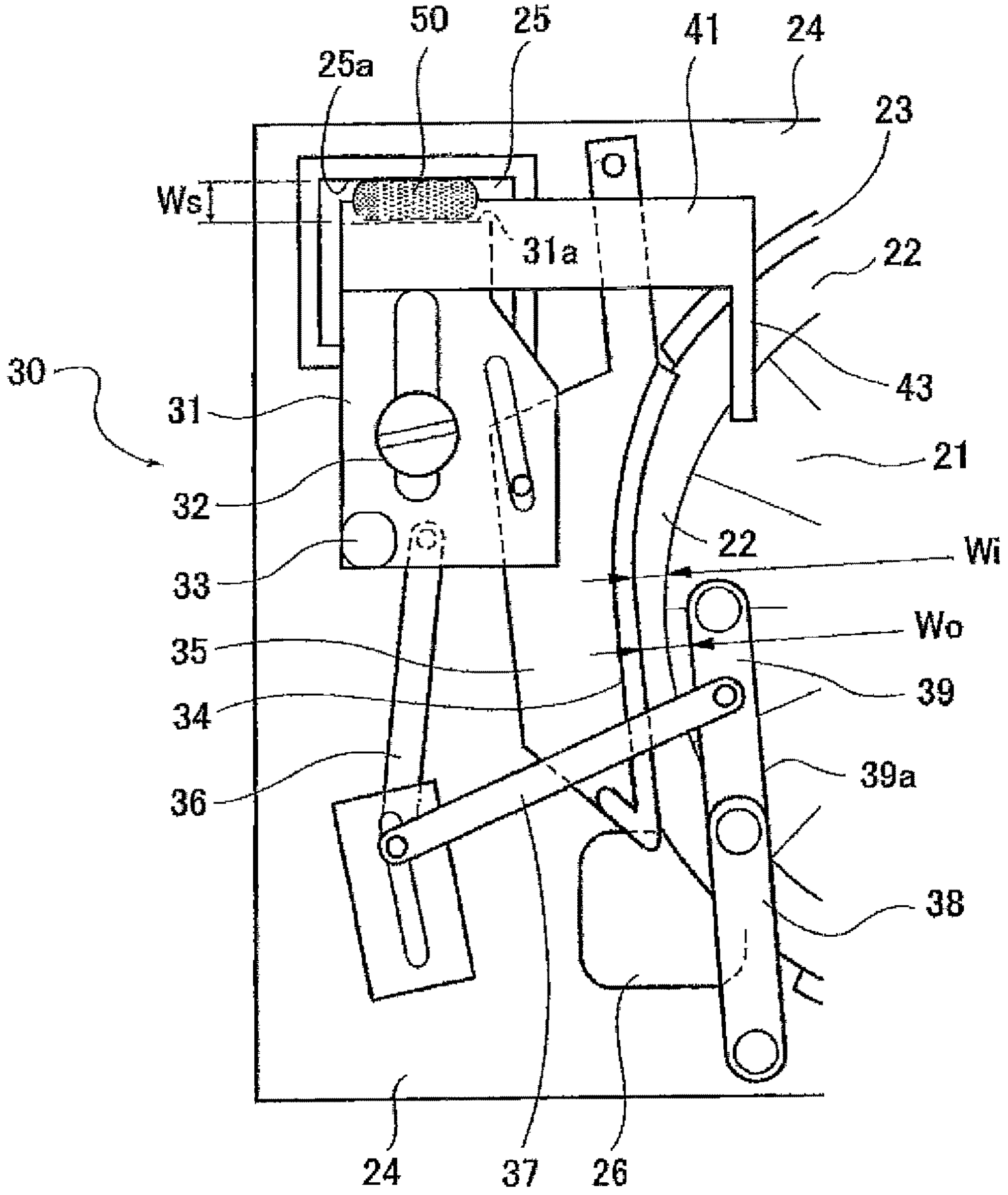
FIG. 4 is another plan view of a portion of the drug feeder illustrated in FIG. 1.

The tablet cassette 20 handles solid drugs, which include tablets in a broad sense, or handles individually transportable separate drugs, such as capsules or tablets in a narrow sense. The tablet cassette 20 includes a width restricting mechanism 30 and a height restricting mechanism 40 illustrated in FIG. 2, so as to be capable of handling a wider range of drugs having various different shapes or sizes. The width restricting mechanism 30 and the height restricting mechanism 40 have improvements, such as being mounted so as to be stacked, for the purpose of easy adjustment so as to be adapted to individual drugs and for the purpose of size reduction. In other words, as illustrated in FIG. 3 or FIG. 4, by manually operating a member described below in such a manner that the member is located beside a sample 50 held in a measurement chamber 25 formed at one corner of the supporting board 24, an adjustment on the width restricting mechanism 30 and an adjustment on the height restricting mechanism 40 are completely performed.

Now, the configuration of each component of the tablet cassette 20 and the configuration around the tablet cassette 20 are described in detail.

As illustrated in FIG. 2, the rotational container 29 includes, besides the central portion 21 and the peripheral portion 22, a rotation transmitting portion 28 meshed to a rotation shaft 12*a* of the motor 12 of the driving unit 11.

The central portion 21 is a central portion of a rotational container that is recessed downward in a mortar shape or inverted conical shape so as to be capable of holding solid drugs in random positions and that has appropriate radial ups and downs, as illustrated in FIG. 1, on the inner surface to transmit rotational movement to the drugs held in the central portion 21.

As illustrated in FIG. 2, the peripheral portion 22 is a flat annular peripheral portion of a rotational container extending from the upper edge of the central portion 21 toward the outer periphery into a flange shape. The upper surface of the peripheral portion 22 is flat so as to allow drugs to be placed thereon in an arc form. The peripheral portion 22 is integrated with the central portion 21 by being integrally formed with the central portion 21, and successively transports drugs arranged on the surface by rotationally moving accompanying axial rotation of the central portion 21.

The rotation transmitting portion 28 is integrated with the central portion 21 and rotates the central portion 21 and the peripheral portion 22 when driven to rotate by rotation of the rotation shaft 12*a*.

The external wall 23 is fixed to the supporting board 24 in an upright position along the outer periphery of the peripheral portion 22 to prevent drugs placed on the surface of the peripheral portion 22 from falling out of the outer periphery, which is the outside of the rotational container 29, due to the centrifugal force. However, the external wall 23 has a gap near the width restricting mechanism 30, such as at a position in front of the dispensing port 26, for discharging the drugs to the outside of the rotational container 29.

At this gap, a width restricting member 34 constituting part of the width restricting mechanism 30, as described below, and a holding-transporting mechanism 39 are disposed. The width restricting member 34 and the holding-transporting mechanism 39 constitute opposing inner and outer members of an dispensing portion that discharges drugs from the rotational container 29 to the outside of the rotational container 29 as dispensed products. An end portion of the holding-transporting mechanism 39 on the drug inlet side is disposed inside the peripheral portion 22. Thus, the dispensing port 26 is allowed to be disposed near the peripheral portion 22. This configuration allows the supporting board 24, or the tablet cassette 20 as a whole, to have a small occupation area.

Although the external wall 23 is a component separate from the flow guiding member 27 in this embodiment, the external wall 23 may be substantially integrated with the flow guiding member 27 by, for example, being smoothly connected to the tip of the flow guiding member 27, so as to become part of the flow guiding member 27. The external wall 23 is not necessarily fixed and may be movably supported by the supporting board 24. The external wall 23 may be movable in directions of the radius of the rotational container 29 in order to, for example, prevent itself from coming into contact with the outer periphery of the peripheral portion 22 as a result of slight adjustment of its position with respect to the rotational container 29 or may be movable in the direction of the circumference of the rotational container 29 in order to, for example, adjust the position of the gap. In addition, the external wall 23 may be supported so as to be attachable to or detachable from the supporting board 24.

The supporting board 24 has a circularly cutout hole portion at a position at which the rotational container 29 is attached. In the state where the rotational container 29 is disposed in the hole portion, the upper surface of the peripheral portion 22 and the upper surface of the supporting board 24 are located at the same level. On the upper surface of the supporting board 24, the measurement chamber 25, the width restricting mechanism 30, and the height restricting mechanism 40 are mounted.

As illustrated in FIG. 3 or FIG. 4, the measurement chamber 25 is defined by a rectangular frame attached to the upper surface of the supporting board 24. The measurement chamber 25 is a small open-top, rectangular parallelepiped chamber having fixed bottom surface and fixed side walls. The measurement chamber 25 can hold one target of measurement. FIG. 4 illustrates a state where a sample 50 is held in the measurement chamber 25, the sample 50 being used as a target of measurement and serving as a substitute for each drug contained in the rotational container 29 and having the same shape as the drug. The target of measurement, however, may be the same drug as each drug held in the rotational container 29. In this embodiment, the sample 50 is used as a target of measurement. As long as the measurement chamber 25 can hold one drug or one sample 50, the measurement chamber 25 may be a small open-top chamber defined by a gate-shaped frame attached to the upper surface of the supporting board 24 and having a fixed bottom surface and fixed three side walls or may be engraved in the supporting board 24.

As described below, the measurement chamber 25 includes a movable wall, which enables width adjustment and faces one of the fixed walls defining the frame. As described below, this movable wall is one end portion of a width adjustment slider 31 constituting part of the width restricting mechanism. The movable wall is substituted by a portion 31*a* inserted into the measurement chamber 25. This movable wall 31*a* is movable toward and away from the opposing fixed wall 25*a*. When the movable wall 31*a* moves toward the fixed wall 25*a*, the movable wall 31*a* holds the sample 50 between the walls 31*a* and 25*a*. In the case where the measurement chamber 25 is defined by a gate-shaped frame, the fixed wall may be a wall opposing an open side.

As illustrated in FIG. 2, the dispensing port 26 vertically extends through the supporting board 24 so as to vertically extend through the tablet cassette 20 and to be connected to the dispensing port 13 of the driving unit 11 below the tablet cassette 20. The dispensing port 26 is formed in the supporting board 24 for size reduction of the tablet cassette 20. The dispensing port 26 allows drugs separated one from another at the dispensing portion and discharged from the rotational container to be accurately delivered to a tablet packaging machine 10 (FIG. 12), which is a destination and described below, using gravitational fall.

As illustrated in FIG. 1, the flow guiding member 27 is a helical flow-directing guide adapted to the inner curved surface of the central portion 21. The flow guiding member 27 is fixed into the central portion 21 using a component such as a support frame, not illustrated, while keeping a slight gap between itself and the inner surface of the central portion 21. While the central portion 21 is axially rotated, the flow guiding member 27 guides the drugs in the rotational container 29, specifically, the drugs held in the central portion 21 from the central portion 21 to the peripheral portion 22 due to relative movement caused by rotation relative to the rotational container 29.

As illustrated in FIG. 3, the width restricting mechanism 30 includes the width adjustment slider 31, which is a driving portion that moves linearly when manually operated for an adjustment of drug width restriction. The width restricting mechanism 30 also includes the width restricting member 34 and a swing board 35. The width restricting member 34 is a driven portion and is one of the opposing inner and outer members, which serves as a swing member disposed on the outer periphery of the rotational container 29. The swing board 35 serves as a transmission mechanism that converts the linear movement of the width adjustment slider 31 into a swing. Besides the swing board 35, the width restricting mechanism 30 includes articulated links 36 to 38 constituting a transmission mechanism. The articulated links 36 to 38 convert the linear movement of the width adjustment slider 31 into swingable sideways movement.

As described above, the width restricting mechanism 30 includes the width adjustment slider 31, the swing board 35, and the articulated links 36 to 38 as components of a link mechanism that constitutes a driving unit that drives the width restricting member 34 with a manual operation.

Besides the width restricting member 34, the width restricting mechanism 30 also includes the holding-transporting mechanism 39 (driven portion) as a driven portion. The holding-transporting mechanism 39 is one of the opposing inner and outer members and serves as a discharging mechanism, which is a belt transport mechanism disposed on the inner periphery of the rotational container 29.

The width adjustment slider 31 also functions as a movable wall 31*a* of the measurement chamber 25 as a result of a first end portion, which is the upper end portion in FIG. 3, entering the measurement chamber 25. The width adjustment slider 31 has an oblong hole that extends through the width adjustment slider 31 at the central portion and into which a setscrew 32 is inserted. The width adjustment slider 31 includes a knob 33, which protrudes at a second end portion, which is the lower end portion in FIG. 3, for a manual operation. The width adjustment slider 31 can be smoothly and linearly moved in the width reduction direction and the reverse direction of the movable wall 31*a*, corresponding to the vertical direction in FIG. 3, by operating the knob 33. For transmission of movement, the width adjustment slider 31 includes an oblong hole, through which a swing pin disposed on the swing board 35 is inserted, and a round hole, through which an axial rotation pin disposed at one end portion of the articulated link portion 36 is inserted. The swing board 35 is located above the peripheral portion 22, that is, further front than the peripheral portion 22 with respect to the plane of FIG. 3.

The setscrew 32 stops movement of the width adjustment slider 31 when rotated so as to fasten the width adjustment slider 31 to the supporting board 24, whereas allows the width adjustment slider 31 to move when rotated in the reverse direction so as to unfasten the width adjustment slider 31. Thus, the setscrew 32 functions as stopping means or a stopper, which is a widthwise stopper that stops movement of the movable wall 31*a* of the measurement chamber 25, formed by one end portion of the width adjustment slider 31.

The width restricting member 34 is disposed upright at a portion of the swing board 35 near the rotational container 29, specifically, near the edge closer to the rotational container 29. The width restricting member 34 swings accompanying a swing of the swing board 35. As in the case of the swing board 35, the width restricting member 34 is located above the peripheral portion 22, that is, further front than the peripheral portion 22 with respect to the plane of FIG. 3. The width restricting member 34 is a wall-shaped member having substantially the same height as the external wall 23 and disposed at the gap of the external wall 23. The width restricting member 34 is disposed on the outer periphery of the dispensing portion in such a manner as to elongate the external wall 23 toward the dispensing port 26. The width restricting member 34 swings in the radial direction of the rotational container 29. The width restricting member 34 increases a width Wi of the space over the surface of the peripheral portion 22 when moving toward the outer periphery, that is, away from the central portion 21 as illustrated in FIG. 3 and decreases the width Wi of the space when moving toward the inner periphery, that is, toward the central portion 21. Drugs that have their center of gravity not located on the peripheral portion 22 in the space having the width Wi, that is, drugs that have their center of gravity located above the central portion 21 fall from the peripheral portion 22 to the central portion 21. Thus, by increasing or decreasing the width Wi of the space over the surface of the peripheral portion 22 so as to restrict the width Wi to approximately twice the width of drugs, which is to serve as a dispensed product after arriving at the dispensing portion, the drugs are prevented from being placed side by side in two lines on the peripheral portion 22. In this manner, the width restricting member 34 can prevent an inner one of the drugs arranged side by side in two lines or drugs oriented in a position inappropriate for being nipped from being guided to the dispensing portion and can restrict the number of drugs that are to be transported to the dispensing portion at a time to one.

The swing board 35 swings the width restricting member 34 in accordance with the forward or reverse movement of the width adjustment slider 31 by converting a linear movement of the width adjustment slider 31 into a swing of the width restricting member 34. The swing board 35 swings the width restricting member 34 toward the inner periphery when the width adjustment slider 31 is operated so that the movable wall 31*a* moves in a direction toward the sample 50 and the fixed wall 25*a*. The swing board 35 swings the width restricting member 34 toward the outer periphery when the width adjustment slider 31 moves backward in the reverse direction.

The articulated links 36 to 38 include the link 36, which has one end portion connected to the width adjustment slider 31, the articulated link portion 37 connected to the link 36 and the holding-transporting mechanism 39, and the articulated link portion 38 connected to the holding-transporting mechanism 39. As illustrated in FIG. 3, the articulated links 36 to 38 cause the holding-transporting mechanism 39 to move sideways toward the inner periphery when the width adjustment slider 31 moves in such a direction as to separate the movable wall 31*a* from the fixed wall 25*a*. The articulated links 36 to 38 cause the holding-transporting mechanism 39 to move sideways toward the outer periphery when the width adjustment slider 31 moves in such a direction as to move the movable wall 31*a* toward the sample 50 and the fixed wall 25*a*. The articulated links 36 to 38 include a large number of links in order to, during this sideways movement, appropriately swing the holding-transporting mechanism 39 and keep the opposing surfaces of the holding-transporting mechanism 39 and the width restricting member 34 parallel to each other as much as possible.

Transmission mechanisms 35 to 38 include the swing board 35 and the articulated links 36 to 38. The transmission mechanisms 35 to 38 connect the width adjustment slider 31, which also serves as the movable wall 25*a*, the width restricting member 34 constituting the opposing inner and outer members for the dispensed product, and the holding-transporting mechanism 39 to one another. The transmission mechanisms 35 to 38 decrease an opposing gap Wo of the dispensing portion, which is an interval between the width restricting member 34 and the holding-transporting mechanism 39, by moving both of the width restricting member 34 and the holding-transporting mechanism 39 so as to come closer to each other in accordance with the width adjustment movement of the width adjustment slider 31. Thus, the opposing gap Wo is determined so as to be slightly larger than or equal to the chamber width Ws, which is an interval between the fixed wall 25*a* and the movable wall 31*a*. Specifically, the transmission mechanisms 35 to 38 change the opposing gap Wo in conjunction with an adjustment of the distance Ws by which the movable wall 31*a*, among the movable wall 31*a* and the fixed wall 25*a* forming a pair of walls that can adjust the distance Ws therebetween, has moved in order to restrict the width of dispensed products placed on the peripheral portion 22. Thus, by placing the sample 50 in the measurement chamber 25 and moving the width adjustment slider 31 for width adjustment, the opposing gap Wo is simply determined in accordance with the chamber width Ws, that is, the width of the sample 50.

As described below, the holding-transporting mechanism 39 includes an endless belt 39*a* having elasticity. The transmission mechanisms 35 to 38 adjust the opposing gap Wo to fall within such a range that the drugs can be held using the belt elasticity. Here, the pair of walls suffice if at least one of the walls is movable so as to be capable of adjusting the distance Ws.

As illustrated in FIG. 3, the holding-transporting mechanism 39 is formed of a belt transport mechanism formed by winding the endless belt 39*a*, serving as the transportation member, around a pair of rotation shafts and being bent over. The holding-transporting mechanism 39 has its transportation surface facing the width restricting member 34 instead of being horizontally placed while having its transportation surface facing up as in a typical manner. The holding-transporting mechanism 39 and the width restricting member 34 are disposed so as to extend from a portion of the rotational container 29 to the outside of the rotational container 29. The holding-transporting mechanism 39 and the width restricting member 34 are disposed at the gap of the external wall 23 so as to pass through the external wall 23 and extend in a direction approximately tangent to the peripheral portion 22. Thus, the holding-transporting mechanism 39 and the width restricting member 34 hold the drugs as dispensed products, which have been transported thereto along the external wall 23 by the upper surface of the peripheral portion 22 and placed on the peripheral portion 22, at a portion having the opposing gap Wo across which the holding-transporting mechanism 39 and the width restricting member 34 face each other. Then, the holding-transporting mechanism 39 and the width restricting member 34 guide and discharge the drugs from the surface of the peripheral portion 22 to the outside of the rotational container 29. When the drugs are held, the endless belt 39*a* serves as a shock-absorber using its elasticity. The use of the endless belt 39*a* is thus advantageous in that the load on the drugs is reduced and that the drugs are highly securely held.

In order to highly effectively gain this advantage of the elasticity of the endless belt 39*a*, the endless belt 39*a* serving as a transportation member is preferably an elastic transportation member having elasticity. The endless belt 39*a* is thus formed of an elastic member having elasticity and contains rubber as a material in this embodiment.

As described above, the transportation member preferably has elasticity. The elastic transportation member is not limited to a belt and may be a roller-shaped member, that is, an elastic roller. In the case of using an elastic roller as a transportation member, it is preferable, from the transportation stability view point, that multiple elastic rollers be arranged in the direction in which the drugs are transported. In the case where multiple elastic rollers are used, plate-shaped or pillar-shaped members or members having other shapes are preferably disposed between wedge-shaped spaces between the elastic rollers as bite preventive members that prevent the drugs from becoming caught between the elastic rollers.

The transportation member is preferably an elastic transportation member. However, the elasticity is not essential as long as the load on the drugs is small. Nevertheless, the transportation member is preferably an endless belt made of an elastic member as in the case of this embodiment, considering the load on the drugs, the capability of transporting the drugs, or other properties as a whole. The capability of transporting the drugs advantageously improves when the transportation member is made of a belt and if the belt has irregularities such as those on a timing belt, wavelike irregularities, or partitions on the drug transporting surface.

The belt rotation speed of the width restricting mechanism 30, that is, the travel speed, which is the rotation speed, of the endless belt 39*a* is determined as follows in order to accelerate the drugs that have arrived at the dispensing portion, separate the drugs from subsequent drugs on the peripheral portion 22, and discharge these drugs as dispensed products. Specifically, the travel speed of the endless belt 39*a* is determined so as to be higher than the peripheral speed of the peripheral portion 22 during rotation, that is, higher than the relative velocity between the peripheral portion 22 and the flow guiding member 27 or the external wall 23. In order to obtain the travel speed of the endless belt 39*a* that causes this relative velocity, the rotation of the rotational container 29 is transmitted to the spindles of the holding-transporting mechanism 39 using a speed increasing gear or other devices. In the case where the tablet cassette 20 has no inconvenience in, for example, power supply, a motor specially designed for the holding-transporting mechanism 39 may be installed and the holding-transporting mechanism 39 and the rotational container 29 may be individually driven at appropriate time or speeds to obtain this travel speed.

The holding-transporting mechanism 39 is disposed in such a manner that the drug inlet end portion is located above the central portion 21 and on the inner side of the peripheral portion 22. Thus, a large part of the holding-transporting mechanism 39 is located over the rotational container 29. This configuration thus allows the dispensing port 26 to be located closer to the rotational container 29 below the articulated links 37 and 38 and part of the dispensing port 26 is in contact with the rotational container 29 when viewed in a plan as illustrated in FIG. 3. In this configuration, the drugs that have been discharged from the surface of the peripheral portion 22 to the outside of the rotational container 29 after being held by the holding-transporting mechanism 39 and the width restricting member 34 are allowed to be guided to the dispensing port 26 and fall down.

Figure 5:
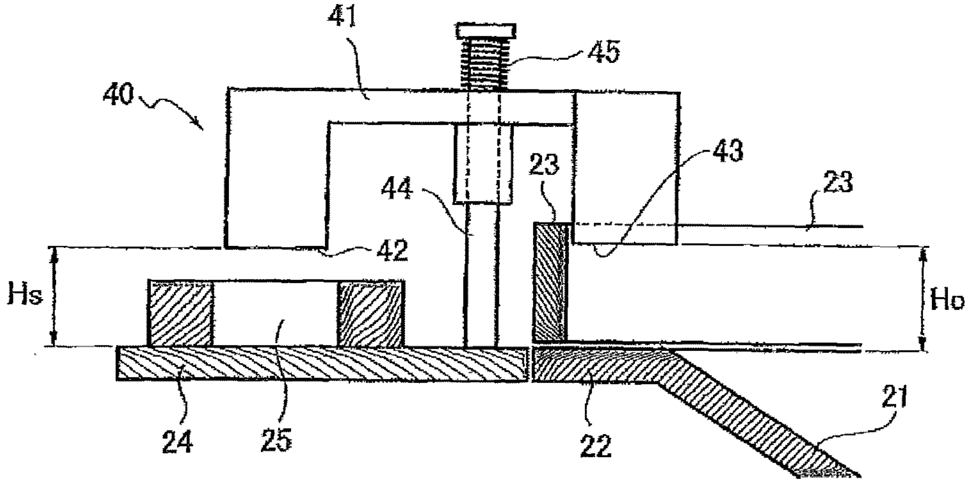
FIG. 5 is a side view of an ascending-descending member and a height restricting member included in the drug feeder illustrated in FIG. 1.

As illustrated in FIG. 5, the height restricting mechanism 40 includes a horizontally oriented ascending-descending member 41, a support strut 44, which supports the ascending-descending member 41 while allowing the ascending-descending member 41 to ascend and descend, and a spring 45, which is fitted onto the support strut 44 and serves as urging means or an urging portion, which is a descent urging portion that urges the ascending-descending member 41 to descend. A first end portion of the ascending-descending member 41 serves as a first protruding portion that protrudes downward so as to be insertable into the measurement chamber 25 from above. A ceiling portion 42 formed by the undersurface of the first protruding portion serves as a ceiling of the measurement chamber 25. A second end portion of the ascending-descending member 41 serves as a second protruding portion that protrudes downward so as to approach the peripheral portion 22 down to a level below the external wall 23. The undersurface of the second protruding portion serves as a height restricting portion 43, which is a height restricting member. The height restricting portion 43 restricts the height of drugs, which are to become dispensed products, placed on the peripheral portion 22 before the drugs arrive at the dispensing portion. In other words, in front of the dispensing portion, that is, upstream of the width restricting member 34 and the holding-transporting mechanism 39 viewed in the direction of flow of drugs caused by the rotation of the peripheral portion 22, the height restricting member restricts the height of the drugs that are to become dispensed products after passing through a space between the width restricting member 34 and the holding-transporting mechanism 39.

Figure 6:
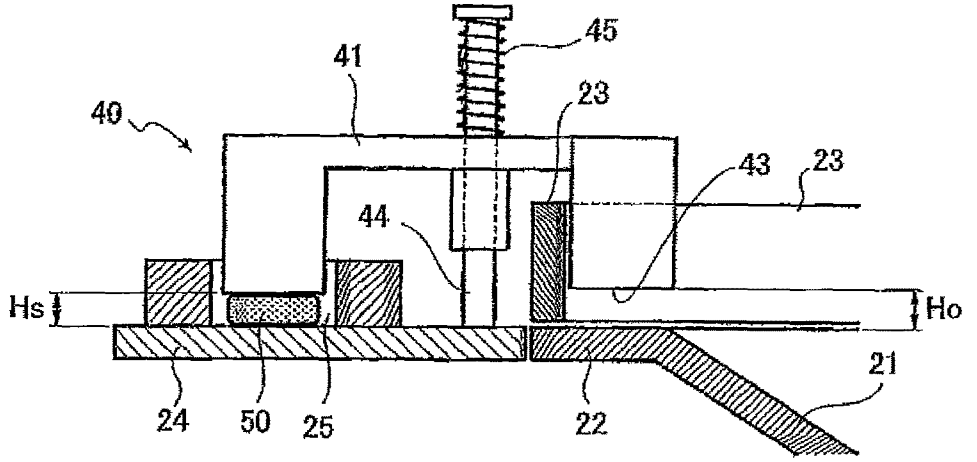
FIG. 6 is a side view of the ascending-descending member illustrated in FIG. 5 in the state of being in contact with a target of measurement.

Both the ceiling portion 42 and the height restricting portion 43 are portions of the ascending-descending member 41 and are connected together as an integrated unit. Thus, when the ascending-descending member 41 illustrated in FIG. 6 is raised, the ceiling portion 42 and the height restricting portion 43 rise accompanying the raise of the ascending-descending member 41. Thus, raising the ascending-descending member 41 increases the ceiling height Hs of the measurement chamber 25 and the restriction height Ho over the peripheral portion 22 defined by the height restricting portion 43, as illustrated in, for example, FIG. 5.

When an operator places the sample 50 in the measurement chamber 25 and then lets go of the ascending-descending member 41, the ascending-descending member 41 falls due to its weight and a downward urging force of the spring 45. Accompanying the fall of the ascending-descending member 41, the ceiling portion 42 and the height restricting portion 43 also fall, so that the ceiling height Hs and the restriction height Ho also decrease. As illustrated in FIG. 6, the ascending-descending member 41 stops falling when the ceiling portion 42 comes on the sample 50.

Figure 7:
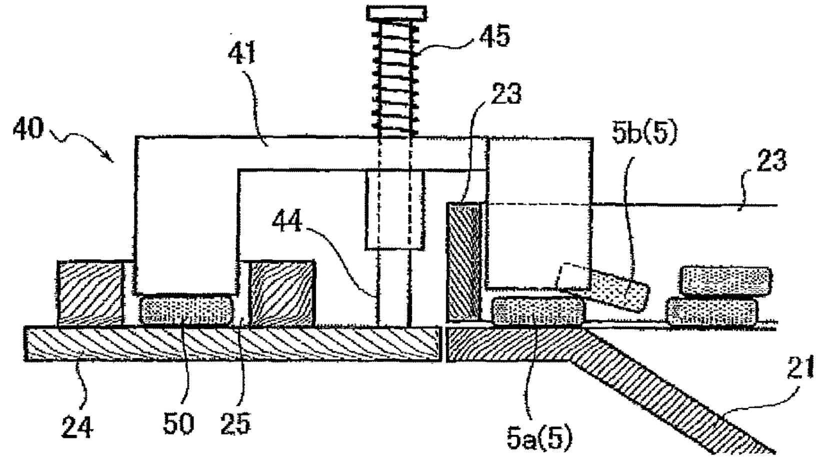
FIG. 7 is a side view of the height restricting member illustrated in FIG. 5 in the state of restricting the height of a dispensed product.

The ascending-descending member 41 ascends or descends with respect to the sample 50 held in the measurement chamber 25 and causes the height restricting portion 43 to ascend and descend. In the height restricting mechanism 40, the height restricting portion 43 is positioned slightly higher than the ceiling portion 42, for example, by approximately half the minimum thickness, which is the thickness of the thinnest drug among various drugs that are to be handled. Thus, in the case where multiple tablets 5 are stacked on the peripheral portion 22, as illustrated in FIG. 7, a lower tablet 5*a* passes below the height restricting portion 43 without being blocked, whereas an upper tablet 5*b* is blocked by the height restricting portion 43. Thus, the upper tablet 5*b* descends from the lower tablet 5*a* and moves to the surface of the peripheral portion 22 or into the central portion 21.

Now, a mode of use and an operation of the tablet cassette 20 as a single unit are described.

Figure 8:
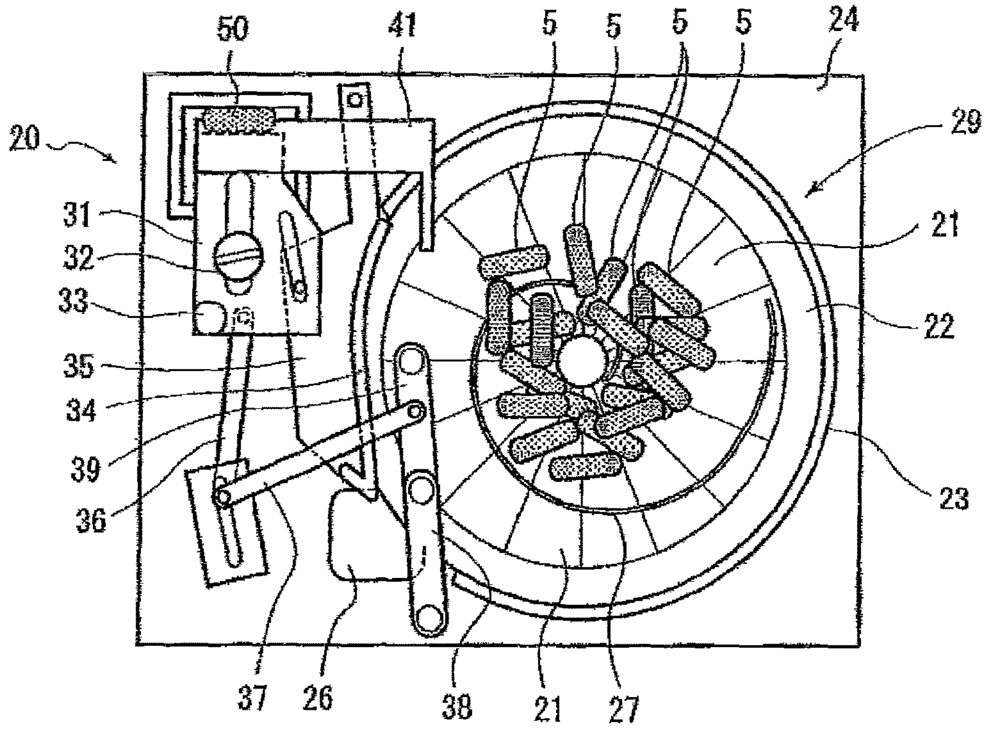
FIG. 8 is a plan view of a container portion included in the drug feeder illustrated in FIG. 1 in the state of holding drugs.

To complete operation preparations, all the following steps are performed in any order: attaching the tablet cassette 20 to the driving unit 11, as illustrated in FIG. 1; installing the sample 50 in the measurement chamber 25, as illustrated in FIG. 4 or FIG. 6; and randomly accommodating a large number of tablets 5 that are to be handled in the central portion 21, as illustrated in FIG. 8.

The installation of the sample 50 into the measurement chamber 25 and the measurement of the sample 50 are performed in the following manner. Firstly, as illustrated in FIG. 3, the width adjustment slider 31 is moved rearward by performing a manual operation on the knob 33 to increase the chamber width Ws of the measurement chamber 25 and the width adjustment slider 31 is retained in this state using the setscrew 32. Subsequently, as illustrated in FIG. 5, the operator picks up the ascending-descending member 41 with his/her fingers to increase the ceiling height Hs and then places the sample 50 into the measurement chamber 25 having its upper surface opened. Thereafter, as illustrated in FIG. 6, the ascending-descending member 41 is lowered. This completes the adjustment of the restriction height Ho.

Then, the setscrew 32 is temporarily unfastened to allow the width adjustment slider 31 to move forward toward the sample 50. This collectively completes the adjustments of the width Wi of the space for width restriction and the opposing gap Wo for holding discharge, as illustrated in FIG. 4 or FIG. 8.

Figure 9:
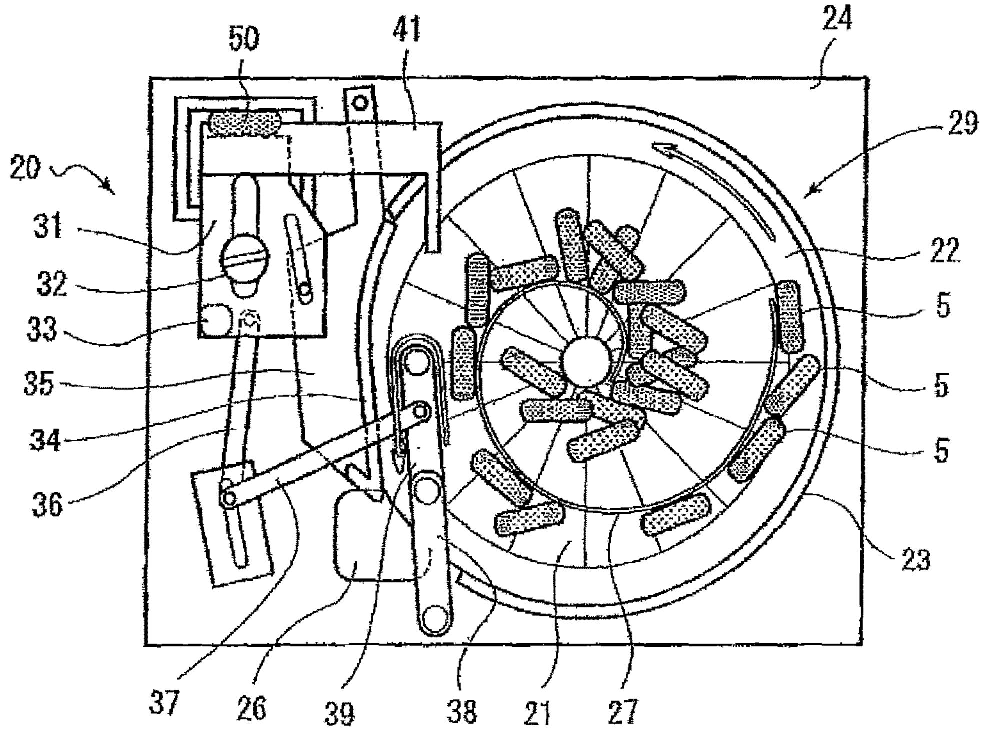
FIG. 9 is a plan view of the drug feeder illustrated in FIG. 1 in the state where a flange portion included in the drug feeder is allowing drugs to be placed thereon.
Figure 10:
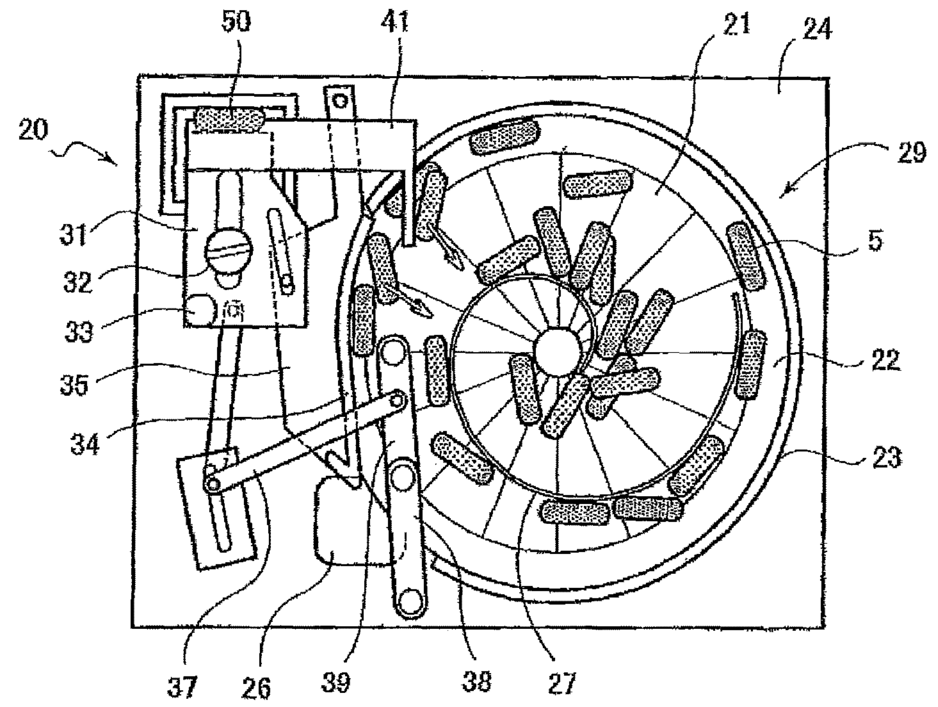
FIG. 10 is a plan view of the drug feeder in the state where the drugs placed on the flange portion illustrated in FIG. 9 are being restricted.

While the tablet cassette 20 thus obtained is in an operable state, if the necessity arises for discharging one tablet 5 as a result of, for example, an manual operation or an automatic control based on prescription information, the driving unit 11 is driven in response to a command from a controller or other devices, not illustrated, and thus the rotational container 29 rotates. When the rotational container 29 rotates, the tablets 5 held in the central portion 21 are guided by the flow guiding member 27 and sequentially transferred onto the surface of the peripheral portion 22, as illustrated in FIG. 9. The tablets 5 placed on the surface of the peripheral portion 22 are transported along the external wall 23 or the width restricting member 34 on the upper surface of the peripheral portion 22 accompanying the rotation of the rotational container 29. In the middle of the transportation, tablets 5 that are even partially superposed on another tablet 5 are stopped being superposed by the height restricting portion 43 of the ascending-descending member 41, as illustrated by the arrows in FIG. 10. In addition, in the middle of the transportation, tablets 5 that are even partially arranged on the inner side of another tablet 5 are returned to the central portion 21 by the width restricting member 34. Thus, only the tablets 5 oriented in a position appropriate for being held by the width restricting member 34 and the holding-transporting mechanism 39 are delivered to the opposing gap between the width restricting member 34 and the holding-transporting mechanism 39 while forming a line.

Figure 11:
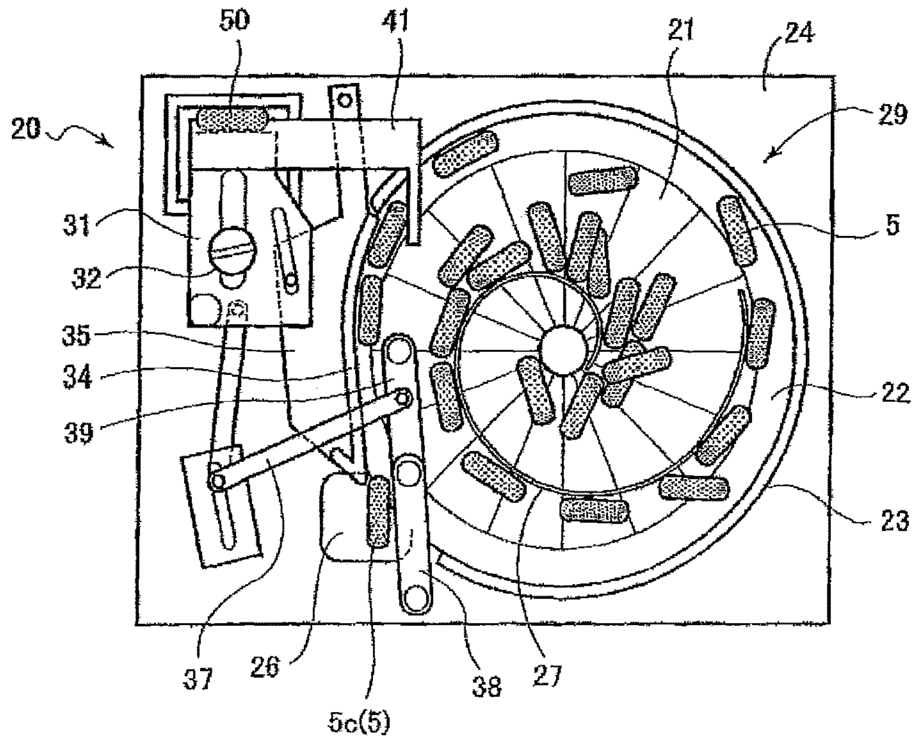
FIG. 11 is a plan view of the drug feeder in the state where the drugs placed on the flange portion illustrated in FIG. 9 are being discharged to the outside of the container including a flange portion.

As illustrated in FIG. 11, tablets 5*c* that have entered this opposing gap are transported by the holding-transporting mechanism 39 at high speed and thus are immediately transported to the dispensing port 26 apart from the subsequent tablets 5. When falling discharge of the tablets 5*c* is detected by a device such as a photosensor, which is not illustrated and faces the dispensing port 13 continuous with the dispensing port 26 below the dispensing port 26, and the discharge of the required number of drugs is complete, the rotational container 29 is immediately stopped being driven to rotate. Here, the subsequent tablets 5 are separated rearward from the preceding tablet 5*c* due to high-speed driving of the holding-transporting mechanism 39. Thus, the subsequent tablets 5 are unable to pass the holding-transporting mechanism 39 before the operations of the rotational container 29 and the holding-transporting mechanism 39 are finished, whereby unintended overdischarge is appropriately avoided.

Thus, the tablet cassette 20 is easily usable in the same manner as in the case of accustomed publicly-known arrangement disk rotation type tablet cassettes.

Although redundant, complicated, and detailed descriptions are omitted, the same procedure is conducted when drugs having other shapes or sizes are to be handled using the tablet cassette 20. Thus, all the operation preparations including an adjustment of the cassette for adaptation to new drugs that are to be newly handled can be easily and speedily finished.

Thus, the tablet cassette 20 can be easily used for drugs having various different shapes or sizes.

Figure 12:
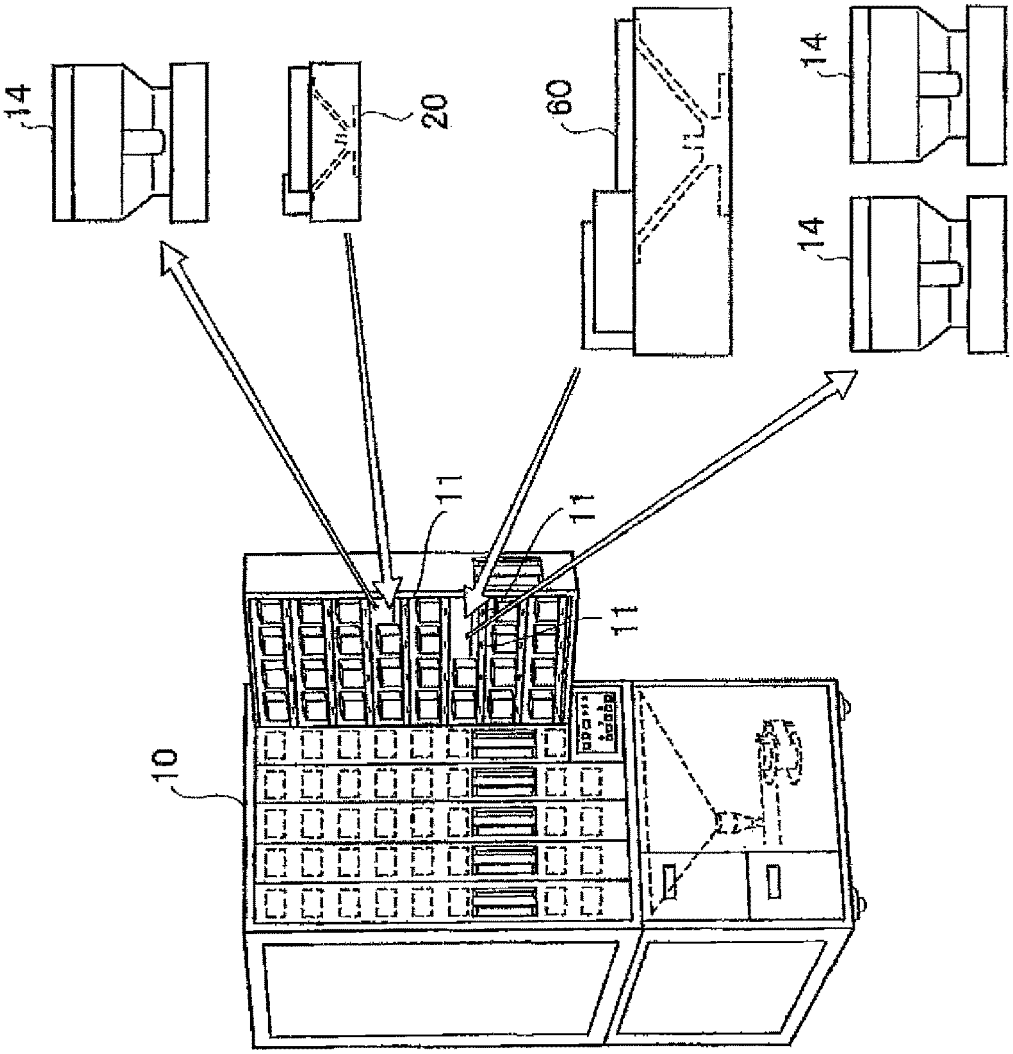
FIG. 12 is an external perspective view of an example of a tablet packaging machine to which the drug feeder to which the present invention is applied is applicable.

Referring now to FIG. 12 and the following drawings, a mode of use is described in which the tablet cassette 20 and a tablet cassette 60 are mounted on the tablet packaging machine 10 illustrated in FIG. 12, the tablet cassette 60 being an example of a drug feeder to which the present invention is applied as in the case of the tablet cassette 20 and has a larger drug capacity than the tablet cassette 20.

Figure 14:
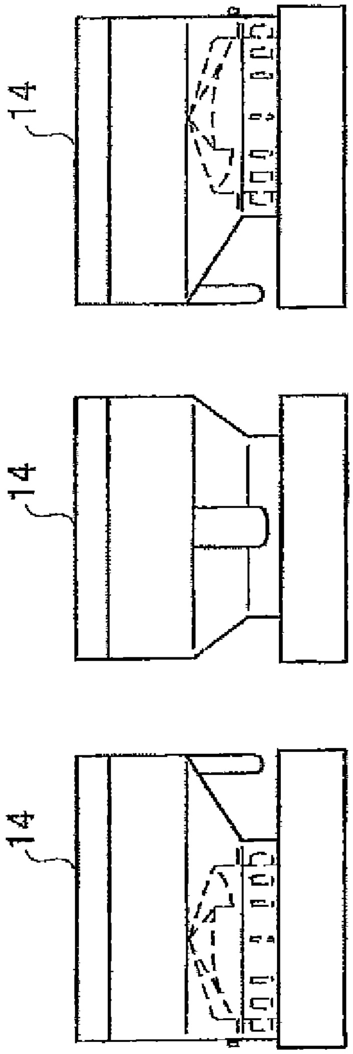
FIG. 14 includes a left side view, a front view, and a right side view of an existing drug feeder.

This mode of use is an example in which the tablet cassettes 20 and 60 are partially installed in the tablet packaging machine 10 that has already been installed and operated in a pharmacy or the like utilizing the configuration of the already installed tablet packaging machine 10 that allows an existing tablet cassette 14 illustrated in FIG. 14 to be attached thereto and detached therefrom.

Figure 13:
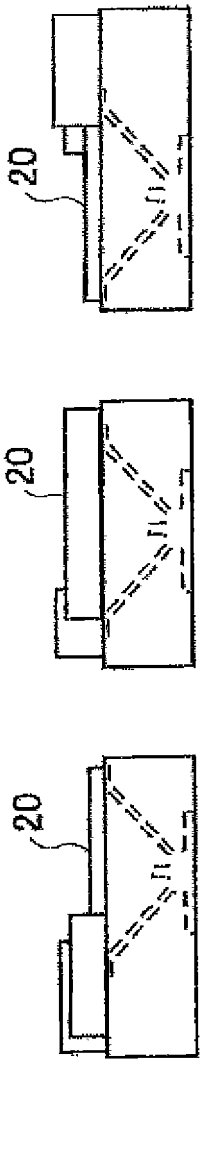
FIG. 13 includes a left side view, a front view, and a right side view of the drug feeder illustrated in FIG. 1.

The tablet cassette 20 illustrated in FIG. 13 is the tablet cassette 20 described above and is interchangeable with the existing tablet cassette 14 illustrated in FIG. 14. Thus, as illustrated in FIG. 12, when one tablet cassette 14 is detached from the tablet packaging machine 10, one tablet cassette 20 becomes attachable to one driving unit 11 corresponding to the detached tablet cassette 14.

As illustrated in FIG. 12, the tablet cassette 60 having a size increased to slightly less than twice the size of the tablet cassette 20 has a drug capacity increased to several times larger. One tablet cassette 60 is attachable to two driving units 11 corresponding to adjacent two tablet cassettes 14 that have been detached.

The tablet cassette 60 is attached in a horizontally oriented position. The tablet cassette 60 is engageable with the rotation shafts 12*a* of two motors 12 equipped with the tablet packaging machine 10. The tablet cassette 60 is capable of using one of the motors 12 for driving the rotational container 29 and the other motor 12 for driving the holding-transporting mechanism 39. Thus, the rotational container 29 and the holding-transporting mechanism 39 are allowed to be independently driven without a motor being mounted on the tablet cassette 60.

[Other]

The above-described height restricting mechanism 40 includes a spring 45 that urges the ascending-descending member 41 to descend but does not include stopping means, which is a stopper that stops the ascending-descending member 41 ascending or descending. However, in order to stop an ascent or descent of the ascending-descending member 41, the height restricting mechanism 40 may include, besides or instead of the spring 45, a member such as the setscrew 32 as stopping means or a stopper serving as a descending stopper.

The width restricting mechanism 30 described above includes the setscrew 32 serving as stopping means for stopping a movement of the width adjustment slider 31, also serving as the movable wall 31*a*, and for stopping an adjustment of the distance Wo. However, the width restricting mechanism 30 does not include urging means or an urging portion that urges the movable wall 31*a* to move for width adjustment and facilitates a decrease of the distance Wo. However, in order to urge the movable wall 31*a* to move for width adjustment, the width restricting mechanism 30 may include, besides or instead of the setscrew 32, a member such as a spring 45 as urging means or an urging portion serving as a width urging portion.

In the above-described mode, each of the tablet cassettes 20 and 60 does not include a lid of the rotational container 29. However, each of the tablet cassettes 20 and 60 may include a lid for opening or closing the rotational container 29. The lid may also function as a cover for the width restricting mechanism 30 or the height restricting mechanism 40.

In the above-described mode, a drug feeder according to the invention is embodied as a detachable tablet cassette 20 that is separated from the driving unit 11. However, the driving unit 11 and the tablet cassette 20 may be integrally formed. A drug feeder according to the invention may be embodied as, for example, a tablet splitter by being combined with a cutter mechanism.

The above-described embodiment discloses the case where the flow guiding member is used as a helical static flow-directing guide. However, the flow guiding member may be another member as long as it can guide the drugs contained in the container from the container portion to the flange portion and may be, for example, an inclined rotator that rotates axially in the container (see, for example, PTL 2).

The flow guiding member suffices if it can guide the drugs contained in the container from the container portion to the flange portion using a relative movement between itself and the container. Specifically, it suffices if it can guide the drugs contained in the container from the container portion to the flange portion as a result of the container and the flow guiding member moving relative to each other in the form of, for example, relative rotation. In other words, as long as the drugs can be guided from the container portion to the flange portion, at least one of the container and the flow guiding member may be moved relative to the other. For example, a configuration may be employed in which the flow guiding member moves relative to the container, for example, a flow guiding member rotates in a static container.

As in the case of the above-described mode in which the container moves relative to a static flow guiding member, when the flow guiding member moves relative to a static container, the speed of the relative movement between the container and the flow guiding member can be regarded as the travel speed of drugs on the flange portion, that is, the travel speed of the drugs moving toward the discharging mechanism. This is because the drugs that have been transferred to the surface of the flange portion after being directly transported by the flow guiding member or indirectly transported by the flow guiding member with other drugs interposed therebetween due to the relative movement between the container and the flow guiding member move on the flange portion at the speed obtained from this relative movement. The speed at which the drugs are transported by the discharging mechanism is determined so as to be higher than the travel speed of the drugs on the flange portion. Thus, the advantages described above, such as that a preceding drug is separated from the subsequent drug, are similarly obtained. The advantages are similarly obtained also in the case where both the container and the flow guiding member move.

An application of a drug feeder according to the present invention is not limited to a substitute for some drug feeders in a tablet packaging machine. Drug feeders according to the present invention may substitute for all the drug feeders in a tablet packaging machine. A drug feeder according to the present invention may be mounted on a tablet splitter that can receive only one or some drug feeders. The mechanism or method for inserting drugs into a drug feeder according to the invention is not limited to the method with which a lid is manually opened or closed during an operation halt of the drug feeder and a large number of drugs are collectively provided. Specifically, the method according to the invention may be a method with which drugs are automatically continuously fed one after another while the drug feeder is in operation or a method with which drugs are frequently inserted in accordance of the degree to which the contained drugs have been decreased.

REFERENCE SIGNS LIST

5, 5*a*, 5*b*, 5*c*: drug (tablet) or dispensed product, 10: tablet packaging machine (drug packaging machine), 11: driving unit, 12: motor, 13: dispensing port, 14: tablet cassette, 20: drug feeder (tablet cassette), 21: container portion, 22: flange portion, 23: external wall, 24: supporting board, 25: measurement chamber, 25*a*, 31*a*: a pair of walls, 26: dispensing port, 27: flow guiding member, 29: container, 30: width restricting mechanism, 31: width adjustment slider (movable wall), 32: stopper (setscrew), 33: knob, 34: width restricting member (swing member, outer one of opposing inner and outer members, or dispensing portion), 35: swing board (transmission mechanism), 36, 37, 38: articulated link (transmission mechanism), 39: discharging mechanism (holding-transporting mechanism, belt transport mechanism, inner one of opposing inner and outer members, or dispensing portion), 40: height restricting mechanism, 41: ascending-descending member, 42: ceiling portion, 43: height restricting member (height restricting portion), 44: support strut, 45: urging portion (spring), 50: substitute or target of measurement (sample or drug), 60: drug feeder (tablet cassette), Wo: interval, and Ws: distance.

The invention claimed is:

1. A drug feeder, comprising:

a container including a container portion, which holds solid drugs, and a flange portion, which is disposed on a periphery of the container portion and allows the drugs to be placed thereon;

a flow guiding member within the container that guides the drugs contained in the container portion to the flange portion using a relative movement between the flow guiding member and the container;

a discharging mechanism comprising a belt transport device disposed so as to extend from a portion of the container to a position outside of the container, the discharging mechanism guiding the drugs placed on the flange portion to the outside as dispensed products;

a width restricting member positioned to face said discharging mechanism, said width restricting member and said discharging mechanism being relatively movable to change an interval between the width restricting member and the discharging mechanism to restrict a width of the dispensed products, and a height restricting member that restricts a height of the dispensed products placed on the flange portion before the dispensed products arrive at the discharging mechanism;

wherein the discharging mechanism discharges the dispensed products to the outside at a speed higher than a speed of the relative movement while holding the dispensed products together with the width restricting member, said drug feeder further comprising a measurement chamber including a first pair of walls, at least one of which is movable so that a distance between the first pair of walls is adjustable, the width restricting member changing the interval between the width restricting member and the discharging mechanism to correspond to the distance between the first pair of walls, and the measurement chamber further including a second pair of walls, at least one of which is movable so that a distance between the second pair of walls is adjustable, the height restricting member changing a distance between the flange and the height restricting member to correspond to the distance between the second pair of walls, the measurement chamber allowing one drug identical to each of the dispensed products or a substitute for the dispensed product having the same shape as the dispensed product to be held between the first and second pairs of walls as a target of measurement; and a transmission mechanism that changes said interval in conjunction with an adjustment of the distance between the first pair of walls.

2. The drug feeder according to claim 1, further comprising:

an ascending-descending member that ascends and descends with respect to the target of measurement held in the measurement chamber and causes the height restricting member to ascend and descend.

3. The drug feeder according to claim 2, further comprising:

at least one of an urging portion, which urges the ascending-descending member to descend, or a stopper, which stops the ascending-descending member ascending or descending.

4. The drug feeder according to claim 1, further comprising:

at least one of an urging portion, which facilitates a decrease of the distance between the first pair of walls, or a stopper, which stops the adjustment of the distance between the first pair of walls.

5. The drug feeder according to claim 2, further comprising:

at least one of an urging portion, which facilitates a decrease of the distance between the first pair of walls, or a stopper, which stops the adjustment of the distance between the first pair of walls.

6. The drug feeder according to claim 3, further comprising:

at least one of an urging portion, which facilitates a decrease of the distance between the first pair of walls, or a stopper, which stops the adjustment of the distance between the first pair of walls.

* * * * *